(12) United States Patent
Graham et al.

(10) Patent No.: US 9,715,547 B2
(45) Date of Patent: Jul. 25, 2017

(54) METHOD AND SYSTEM FOR PROVIDING NEWSFEED UPDATES (75) Inventors: Mark Anthony Graham, Toronto (CA); Catherine Elizabeth Graham, Toronto (CA)

(73) Assignee: Commonsku Inc., Toronto, Ontario ( * ) Notice: Subject to any disclaimer, the term of this patent is extended or adjusted under 35 U.S.C. 154(b) by 334 days.

(21) Appl. No.: 13/541,352

(22) Filed: Jul. 3, 2012

(65) Prior Publication Data

US 2013/0019168 A1    Jan. 17, 2013

Related U.S. Application Data (60) Provisional application No. 61/508,326, filed on Jul. 15, 2011.

(51) Int. Cl.
G06F 17/30    (2006.01)

(52) U.S. Cl.
CPC ............... *G06F 17/30867* (2013.01)

(58) Field of Classification Search
CPC ..... G06F 17/21; G06F 17/30; G06F 17/30017
USPC .......................................... 715/256
See application file for complete search history.

(56) References Cited

U.S. PATENT DOCUMENTS

| 6,920,605 | B1 * | 7/2005 | Challenger | G06F 17/24 715/209 |
| 8,249,857 | B2 * | 8/2012 | Bodin et al. | 704/2 |
| 8,600,802 | B1 * | 12/2013 | Tveit et al. | 705/14.1 |
| 8,819,070 | B2 * | 8/2014 | Alterman | 707/794 |
| 2002/0072988 | A1 | 6/2002 | Aram | 705/26 |
| 2002/0091741 | A1 * | 7/2002 | Ferreira et al. | 707/530 |
| 2007/0094346 | A1 | 4/2007 | Nussey | 709/217 |
| 2007/0100836 | A1 * | 5/2007 | Eichstaedt et al. | 707/10 |
| 2007/0106754 | A1 * | 5/2007 | Moore | G06F 17/3089 709/217 |
| 2007/0183354 | A1 * | 8/2007 | Schuelke | H04L 67/104 370/312 |
| 2007/0230787 | A1 * | 10/2007 | Belitskaya et al. | 382/182 |
| 2008/0244091 | A1 * | 10/2008 | Moore et al. | 709/246 |
| 2009/0276305 | A1 * | 11/2009 | Clopp | G06Q 30/00 705/14.16 |
| 2009/0299976 | A1 * | 12/2009 | Dexter | 707/3 |

OTHER PUBLICATIONS

Al Carlton; Which blogs have the most feed subscribers; Apr. 23, 2007; Selfmademinds.com; pp. 1-15.*

* cited by examiner

*Primary Examiner* — Andrew Dyer
(74) *Attorney, Agent, or Firm* — McMillan LLP (57) ABSTRACT A method and computer system for providing newsfeed updates is provided. Event data for a set of events from at least one enterprise resource planning application is received via a newsfeed application executing on a computing device. A first newsfeed is generated for a first party from the event data. A second newsfeed is generated for a second party from the event data. The second newsfeed is more generic than the first newsfeed.

15 Claims, 7 Drawing Sheets

METHOD AND SYSTEM FOR PROVIDING NEWSFEED UPDATES

METHOD AND SYSTEM FOR PROVIDING NEWSFEED UPDATES

This application claims priority from U.S. Provisional Patent Application Ser. No. 61/508,326 filed on Jul. 15, 2011, the contents of which are incorporated herein by reference.

FIELD OF THE INVENTION

The present invention relates generally to a news service. In particular, the invention relates to a method and system for providing newsfeed updates.

BACKGROUND OF THE INVENTION

Newsfeeds are known, and provide users notification of frequently-updated content. Text messages and multimedia files are uploaded to a system and presented as a stream of updates to a viewer via a Web page. Access to newsfeeds can, in some cases, be controlled, such as on FACEBOOK.

Where such newsfeed applications can enable different users to view the same updates, the updates are the same across all users. This can be undesirable in some environments.

It is therefore an object of the invention to provide a novel method and system for providing newsfeed updates.

SUMMARY OF THE INVENTION

According to an aspect of the invention, there is provided a method for providing newsfeed updates, comprising:

receiving event data for a set of events from at least one enterprise resource planning application via a newsfeed application executing on a computing device;

generating a first newsfeed for a first party from said event data; and generating a second newsfeed for a second party from said event data, said second newsfeed being more generic than said first newsfeed.

The first party can be a distributor, and the second part can be a supplier.

At least part of the event data in the second newsfeed that is presented in the first newsfeed can be obscured. The at least part of the event data presented in the first newsfeed can be replaced with a more generic descriptor of the at least part of the event data.

The receiving can include reading log entries for the enterprise resource planning applications. The method can further include storing the event data in a database. The method can further include:

translating user identifiers in said event data from said enterprise resource planning applications to common user identifiers; and storing said common user identifiers in said database.

The method can further include:

receiving message data for a set of messages via said newsfeed application executing on said computing device, each of said messages corresponding to one of said events.

At least one of the messages presented in the first newsfeed can be absent in the second newsfeed.

According to another aspect of the invention, there is provided a computer system for providing newsfeed updates, comprising:

storage storing a database;

a processor executing a newsfeed application, said newsfeed application configured to receive event data for a set of events from at least one enterprise resource planning application, generate a first newsfeed for a first party from said event data, and generate a second newsfeed for a second party from said event data, said second newsfeed being more generic than said first newsfeed.

The first party can be a distributor, and the second party can be a supplier.

At least part of the event data in the second newsfeed that is presented in the first newsfeed can be obscured. The at least part of the event data presented in the first newsfeed can be replaced with a more generic descriptor of the at least part of the event data.

The newsfeed application can read log entries for the enterprise resource planning applications. The newsfeed application can store the event data in the database. The newsfeed application can translate user identifiers in the event data from the enterprise resource planning applications to common user identifiers, and store the common user identifiers in the database.

The newsfeed application can receive message data for a set of messages via the newsfeed application executing on the computing device, each of the messages corresponding to one of the events. At least one of the messages presented in the first newsfeed can be absent in the second newsfeed.

According to a further aspect of the invention, there is provided a computer-readable medium having stored thereon computer-executable instructions implementing a newsfeed application when executed on a computer system, said newsfeed application configured to receive event data for a set of events from at least one enterprise resource planning application, generate a first newsfeed for a first party from said event data, and generate a second newsfeed for a second party from said event data, said second newsfeed being more generic than said first newsfeed.

According to yet another aspect of the invention, there is provided a method for providing newsfeed updates, comprising:

receiving event data for a set of events from at least one enterprise resource planning application via a newsfeed application executing on a computing device; and generating a newsfeed from said event data.

BRIEF DESCRIPTION OF THE DRAWINGS

Embodiments will now be described, by way of example only, with reference to the attached Figures, wherein.

DETAILED DESCRIPTION OF THE EMBODIMENTS

The invention disclosed herein relates to a method and system for providing newsfeed updates for the enterprise resource planning ("ERP") field.

In order to illustrate the invention, it will now be described in accordance with an embodiment thereof. The newsfeed generated in accordance with this embodiment aggregates information across a network in real time and in chronological order, and is tied directly into various ERP applications, such as CRM, e-commerce and order management functions. The newsfeed entries can include links to people, organizations, and objects in a CRM system, to orders and estimates in an order management application, etc. based on the objects referenced in the event logs for the systems. These links can enable users to quickly view and edit (where allowed) objects, such as orders, quotes, contact information for people, products, etc. by launching the appropriate ERP client application. The resulting newsfeeds provide a sense of a distributor's business in real time. In this manner, the newsfeeds keep track of critical sales and marketing activities in the system in addition to status updates. It is also possible to comment or otherwise post on each newsfeed update to enable communication between all relevant participants. All comment threads are email redundant so people do not miss parts of the conversation. This allows different users to collaborate with one another around real-time business opportunities.

Another aspect is that a computer system in accordance with this embodiment also enables suppliers to participate, and presents newsfeeds to suppliers. The updates for a newsfeed presented to a distributor may differ from those presented to a supplier. The computer system enables suppliers and distributors to collaborate together by generating a sanitized newsfeed corresponding to the newsfeed generated for a distributor, so (i) customer information is not divulged to the supply chain and (ii) comment threads are also protected based on whether the newsfeed is being generated for the distributor or a supplier. That is, the newsfeed update corresponding to an event for a distributor may differ from the newsfeed update for a supplier. The particular details are customized to be relevant to the specific party to which the updates are being shown. For example, a SKU number used by a supplier will be less relevant to a distributor. Further, some updates may be presented to the distributor but not to the supplier. This allows for suppliers to be engaged in a distributor's business in real time so they can help close sales opportunities for distributors.

In order to preserve the confidentiality of the distributors' relationships, pricing, and business affairs, these details may be concealed from the suppliers. For example, when a distributor creates an estimate for a customer, the following entry may appear in the distributor's newsfeed: "Stephen Musgrave created estimate #13699 ($1,368.00) for Mosaic". For the same update, the supplier's newsfeed can conceal customer and pricing details that the distributor may not wish to reveal to suppliers. For example, the following entry can be presented in a supplier's newsfeed for the same update: "Stephen Musgrave quoted 100 units of SKU 85032 for a client in the Advertising industry". The newsfeed entry presents those details that are relevant to the supplier's role.

Comment threads can also represent confidential information to a distributor. For example, if a distributor posts a question on the computer system and is directed at four suppliers, each of the four suppliers will be able to comment back to that distributor yet none of the suppliers will be able to see what the other has said. The only people with a full view of the four comment threads are the people who work at the distributor associated with the user who posted the question. If a colleague of the person who posted the question comments on the post, this will start a separate thread that is only visible to all users within the distributorship (that is, suppliers would not see this comment). The exception to this is if a distributor posts a comment to an existing supplier thread as that would be encapsulated within the specific thread and would be visible to the distributor and the supplier associated with that thread.

Figure 1:
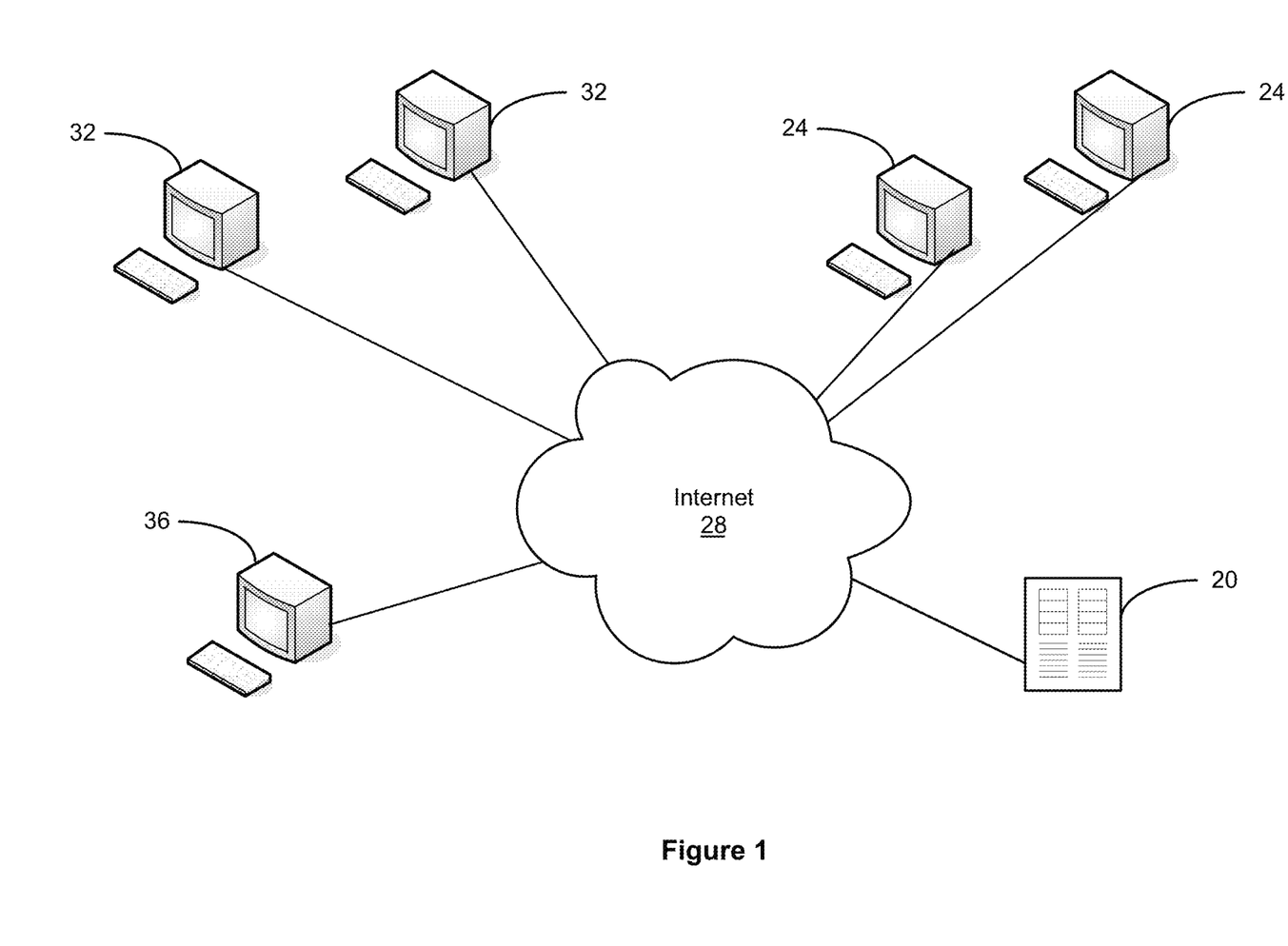
FIG. 1 shows a high-level architecture of a computer system for providing newsfeed updates in accordance with an embodiment of the invention and its operating environment.

FIG. 1 shows a computer system 20 for providing newsfeed updates in accordance with the embodiment of the invention, and its operating environment. The computer system 20 can be, for example, one or more physical computers that cooperatively provide the functionality described herein. Two distributor computers 24 are shown in communication with the computer system 20 over a communications network such as the Internet 28. The distributor computers 24 are workstation computers that are operated by users working for one or more distributors of products. Two supplier computers 32 are also shown in communication with the computer system 20 via the Internet 28. The supplier computers 32 are workstation computers that are operated by users working for one or more suppliers of products. The supplier computers 32 are operated by users employed by suppliers that supply products to the distributors. A consumer computer 36 is shown in communication with the computer system 20 via the Internet 28. The consumer computer 36 is a workstation computer that is operated by a consumer of the goods being made available through the distributor. The consumer computer 36 is operated by a user working for an organization that purchases products from the distributors.

Figure 2:
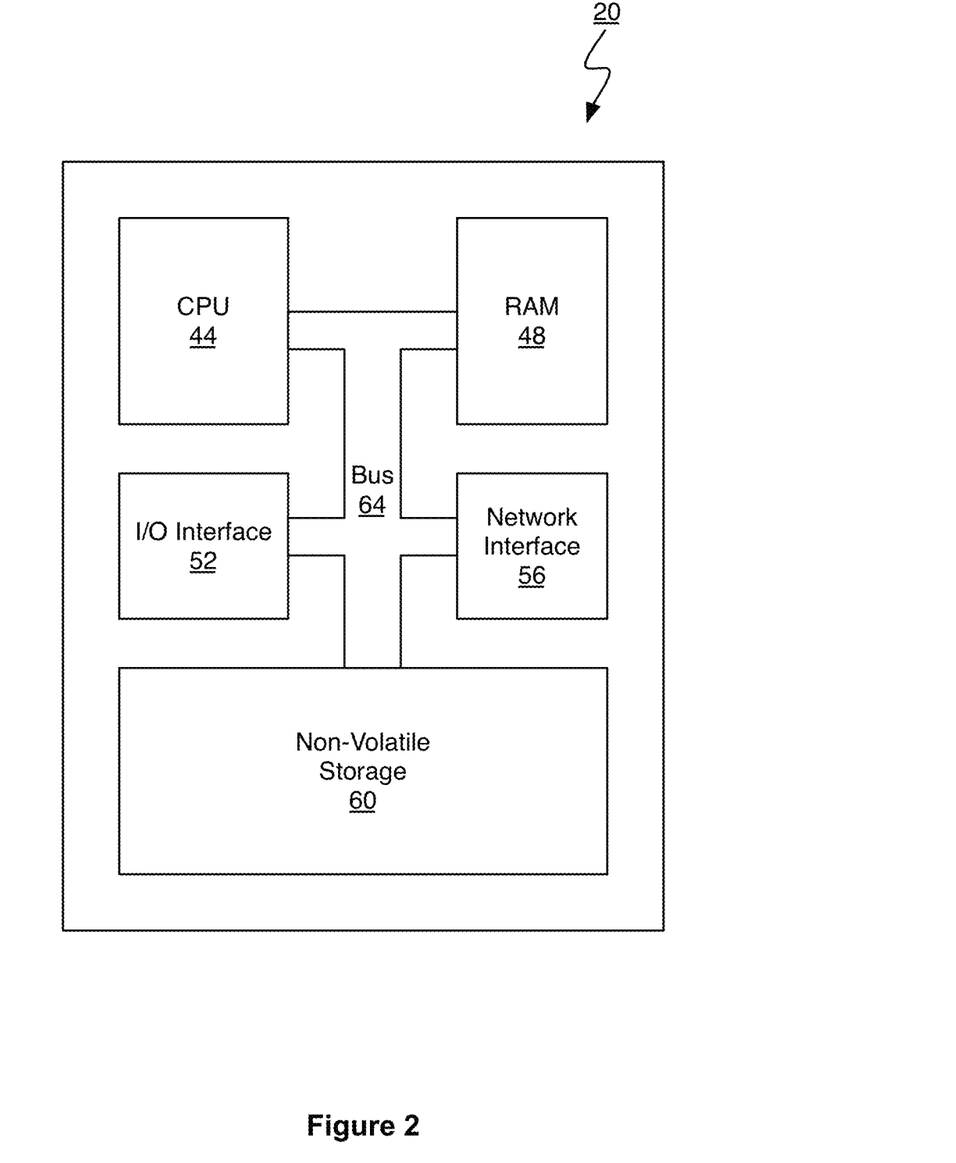
FIG. 2 shows a schematic diagram of the computer system of FIG. 1.

FIG. 2 shows various physical elements of the computer system 20. As shown, the computer system 20 has a number of physical and logical components, including a central processing unit ("CPU") 44, random access memory ("RAM") 48, an input/output ("I/O") interface 52, a network interface 56, non-volatile storage 60, and a local bus 64 enabling the CPU 44 to communicate with the other components. The CPU 44 executes an operating system, a newsfeed application and a number of enterprise systems. RAM 48 provides relatively-responsive volatile storage to the CPU 44. The I/O interface 52 allows for input to be received from one or more devices, such as a keyboard, a mouse, etc., and outputs information to output devices, such as a display and/or speakers. The network interface 56 permits communication with other systems. Non-volatile storage 60 stores the operating system and programs, including computer-executable instructions for implementing one or more ERP applications, the newsfeed application, and the data for the ERP applications and the newsfeed application. During operation of the computer system 20, the operating system, the applications and the data may be retrieved from the non-volatile storage 60 and placed in RAM 48 to facilitate execution.

In the described embodiment, the computer system 20 hosts various ERP applications, including a customer relationship management ("CRM"), e-commerce and order management application for the promotional products industry. In addition to these core components, the computer system 20 provides the newsfeed application that is a social architecture connecting users within an order management environment via newsfeeds. The distributor organization is a seller of promotional products. The suppliers provide goods, such as apparel, custom products, etc.

The newsfeeds include events and messages. Events are dynamically-populated entries based on actual activities in the system. As the CRM, e-commerce, order management and other ERP applications generate updates, these updates are retrieved by the newsfeed application executed by the computer system 20. In turn, the computer system 20 generates event objects corresponding to the events. Further, the computer system 20 enables consumers to post messages for the events. Messages can include posts of comments, images, links, etc. to users, groups and individuals for social interaction or to exchange information, such as questions and comments regarding products, purchase orders, etc.

In the described embodiment, the consumers are not presented with a newsfeed by the computer system 20.

Figure 3:
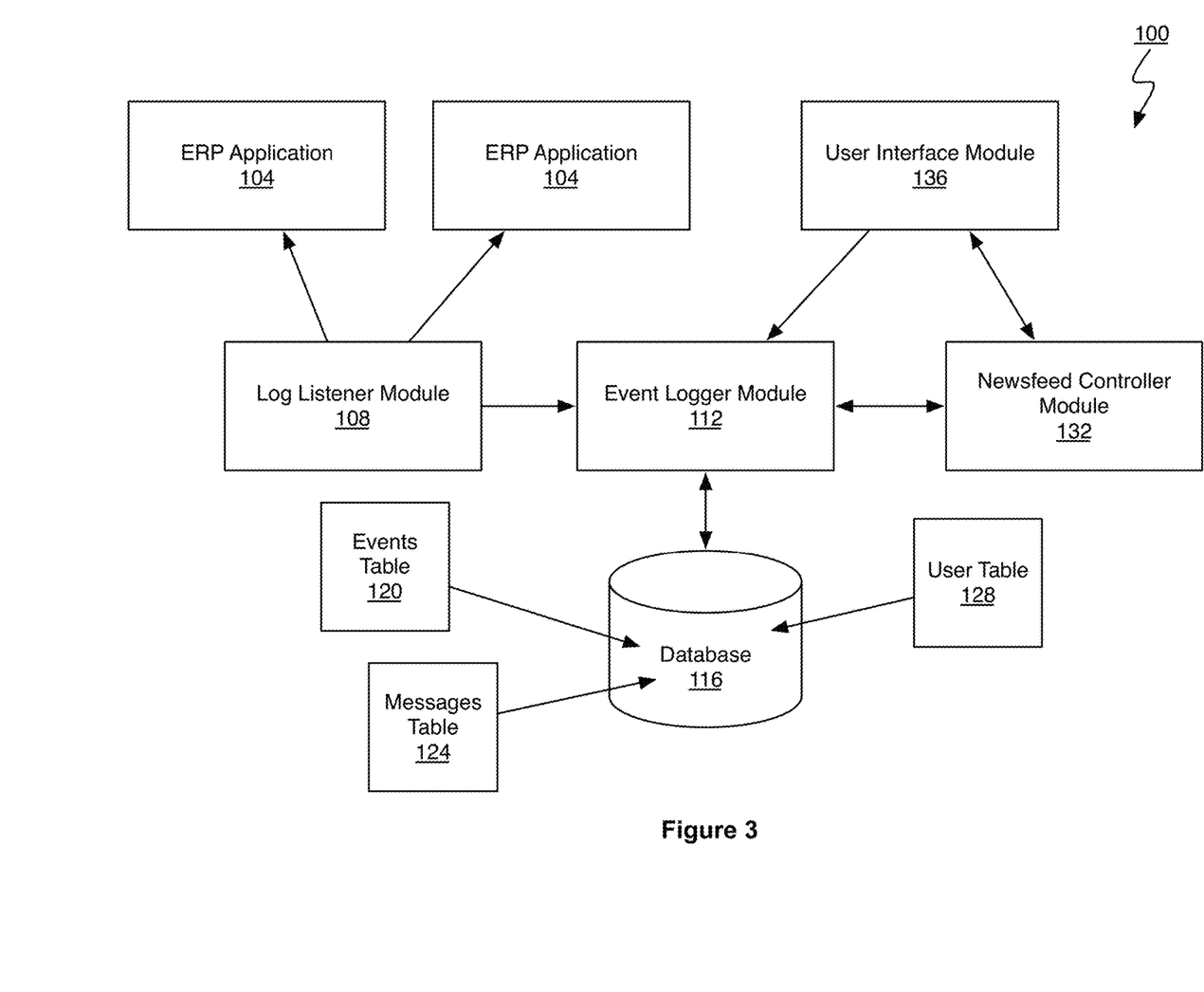
FIG. 3 shows various logical components of the computer system for providing newsfeed updates of FIG. 1.

FIG. 3 shows various logical elements of the computer system 20. One or more ERP applications 104 execute on the computer system 20 for integrating internal and external management information across an entire organization, embracing finance/accounting, manufacturing, sales and service, customer relationship management, etc. ERP applications 104 automate this activity with an integrated software application.

The ERP applications 104 generate logs of events that occur within them. The event data contained in the logs serves as a basis for the construction of most of the newsfeeds. The event data includes the following information:
event type: indicates whether an event is being created, modified or deleted
event controller: the controller the event message is delegated to (order, item, product, etc.)
event user: the user that initiated the event
event payload: any additional information that should be passed on with the event
event link: link to view the event in the particular ERP application A log listener module 108 is configured to read entries in the event logs of the ERP applications 104 as they are written. The log listener module 108 then passes the event data to an event logger module 112. The event logger module 112 then registers the event data in a database 116. In particular, the event logger module 112 stores the event data in an events table 120 and assigns an event key to it. In addition, the event logger module 112 stores message data corresponding to messages related to the events in a messages table 124 in the database 116, together with the event key of the event to which the messages relate. A user table 128 stores a list of users of the newsfeed application, their login credentials, each user's ERP application user ID for each ERP application 104, a universal user ID for the newsfeed application, and a organization ID that identifies the organization that the user works for or a group to which the user belongs. When the event logger module 112 registers event data in the events table 120, it looks up the universal user ID and organization ID corresponding to the user identified by the ERP application user ID in the event data received from the ERP application 104 and stores them with the event data in the events table 120. In this manner, all events pertinent to a particular user can be quickly located in the events table 120 using the user's universal user ID and organization ID.

The event logger module 112 communicates the event data and related message data to a newsfeed controller module 132. The newsfeed controller module 132 generates newsfeed updates by determining for each event if a corresponding event object should be created in the newsfeed. An event object is like a discussion thread. If an event object has not yet been created for the subject of the event, then one is created.

Distributor computers 24, supplier computers 32, and consumer computers 36 to receive and interact with newsfeeds presented via a web interface that is generated by a user interface module 136. The user interface module 136 includes a web server module for generating the web interface, which can receive event data for events for which event objects are created, and message data for messages related to the events in the newsfeeds. The web interface communicates the message data received via the web interface from the distribution computers 24, the supplier computers 32 or the customer computer 36 back to the user interface module 136, which, in turn, passes it on to the event logger module 112 for storage in the messages table 124. The web interface presenting the newsfeeds to each user is customized for that particular user. The web interface can be a dynamic web page, portions of which can be asynchronously updated to enable the updating of the newsfeed as event and message updates are received by the computer system 20 without the need to refresh the entire web page.

Figure 4:
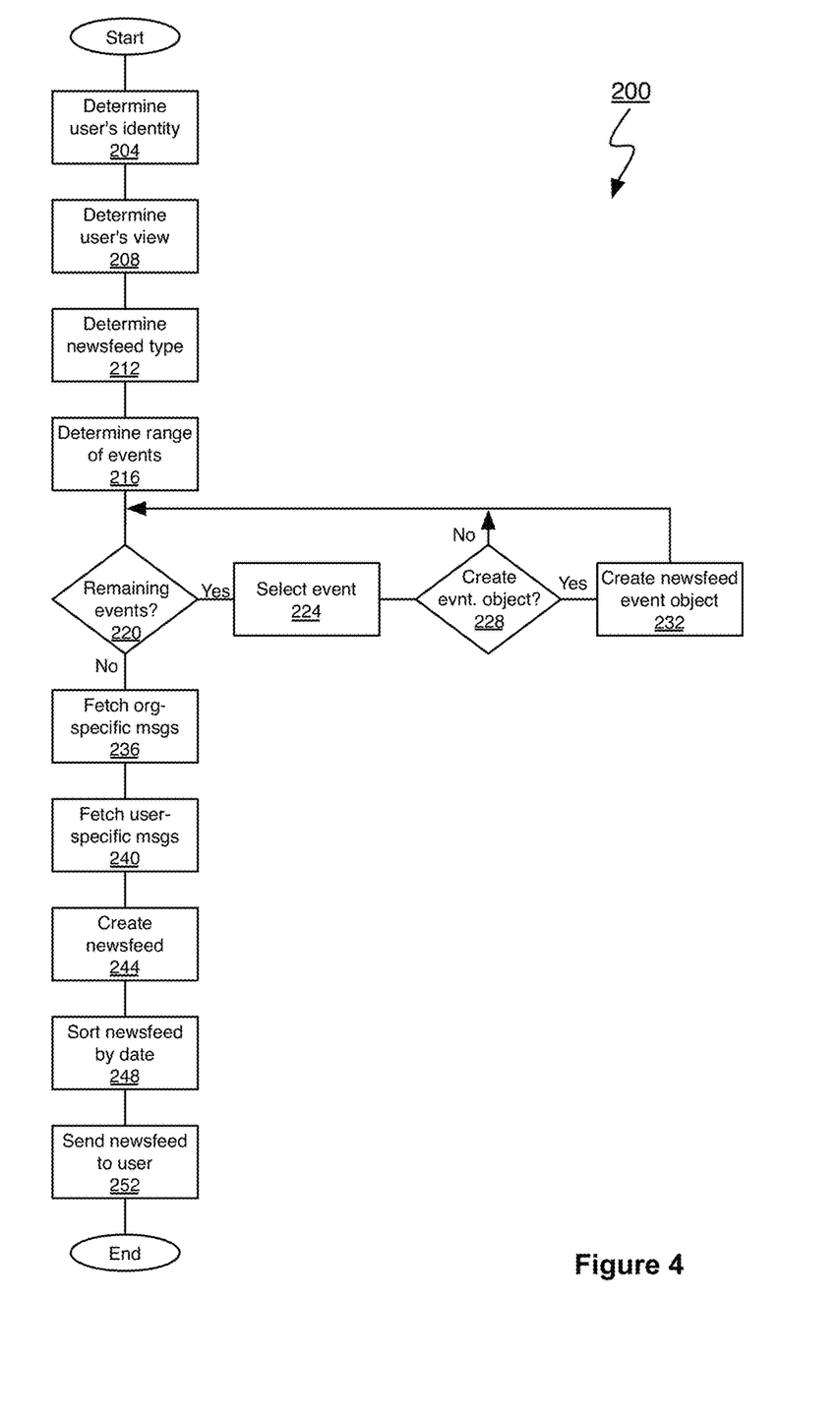
FIG. 4 shows the general method of providing newsfeed updates used by the computer system of FIG. 1.

Events and messages that may result in newsfeed updates include, but are not limited to, the following:
creation of a quote
placement of a purchase order
entry of a comment or question
uploading of a multimedia file, such as an image or a video
sharing of a uniform resource identifier ("URI"); i.e., a link FIG. 4 shows the general method of providing newsfeed updates used by the computer system 20. When a user loads the web interface generated by the user interface module 136, the web interface requires the user to log in via a username and password. The username and the password received are checked against the username and password stored by the computer system 20 in the user table 128 to authenticate the user. Once the user is logged in, the web interface retrieves the newsfeed data to be presented to the user.

The method 200 commences with the determination of the user's identity (204). The user's identity includes the universal user ID and an organization ID which are determined by looking up the username provided at login of the user in the user table 128. The universal user ID uniquely identifies the specific individual user. The organization ID identifies the group to which the user belongs. For example, the organization ID can identify a particular distributor, supplier, or customer. In addition, the organization ID can also identify a particular user group within the distributor, supplier, or customer, such as executives, administrative assistants, etc. Next, the user's view is determined (208). The web interface generated by the user interface module 136 allows a user to switch between different views that include events only, messages only or a combination of both. A browser cookie stores the currently-selected state of the web interface and maintains it until the user elects to switch to a different view. When a user loads the web interface for the newsfeed, the currently-selected view is identified to the computer system 20 via the browser cookie passed to the computer system 20 with the request for the web interface. The user interface module 136 determines the currently-selected view and notifies the newsfeed controller module 132. Next, the newsfeed type is determined (212). The newsfeed type depends on the state of the web interface presented to a user on a distributor computer 24, a supplier computer 32, or a customer computer 36. When a user first logs into the computer system 20 via the web interface, the user is presented with a home page. The user can then navigate back and forth between the home page and a profile page. The newsfeed presented to the user for these two circumstances varies.

Once the user's requirements have been determined at 204 to 212, the range of events to display is determined (216). The newsfeed controller module 132 can specify a date range for events to be fetched from the events table 120. Alternatively, the newsfeed controller module 132 can fetch the most recent N events from the events table 120. The newsfeed controller module 132 retrieves these events from the events table 120 using the universal user ID and the organization ID. Upon retrieval of the events, each event is processed to determine if objects should be created for the event. First, it is determined if there are events remaining to be examined (220). The list of retrieved events is processed one at a time until all of the retrieved events have been examined. An unexamined event is selected from the list (224).

The selected event is examined to determine if a corresponding event object should be created in the newsfeed (228). An event object is created for an event in a newsfeed if one previously has not been created for the same general event. That is, where an event relates to the creation of an order estimate, an event object may be created, but when the event relates to the modification of the same order, an event object for the order estimate already exists and, thus, another event object is not created.

The following is a list of scenarios in which an event causes an event object to be created:
  an estimate is created
  a sales order is put into production
  a new product is added to the system
  a note is added to a client
  a sales order is approved by a client feedback is received on an order
  feedback is received on a product For each event, an algorithm specific to the event class (e.g., order, product) and action (e.g., create, modify, delete) is used. The algorithm then determines if an event object should be created for that event by looking at a small amount of information in the event database table 112. The information is a combination of the class (e.g., order, product) and action (i.e., create, modify, delete). If the information matches one of the scenarios in which an event causes an event object to be created, then the event is displayed.

Figure 5:
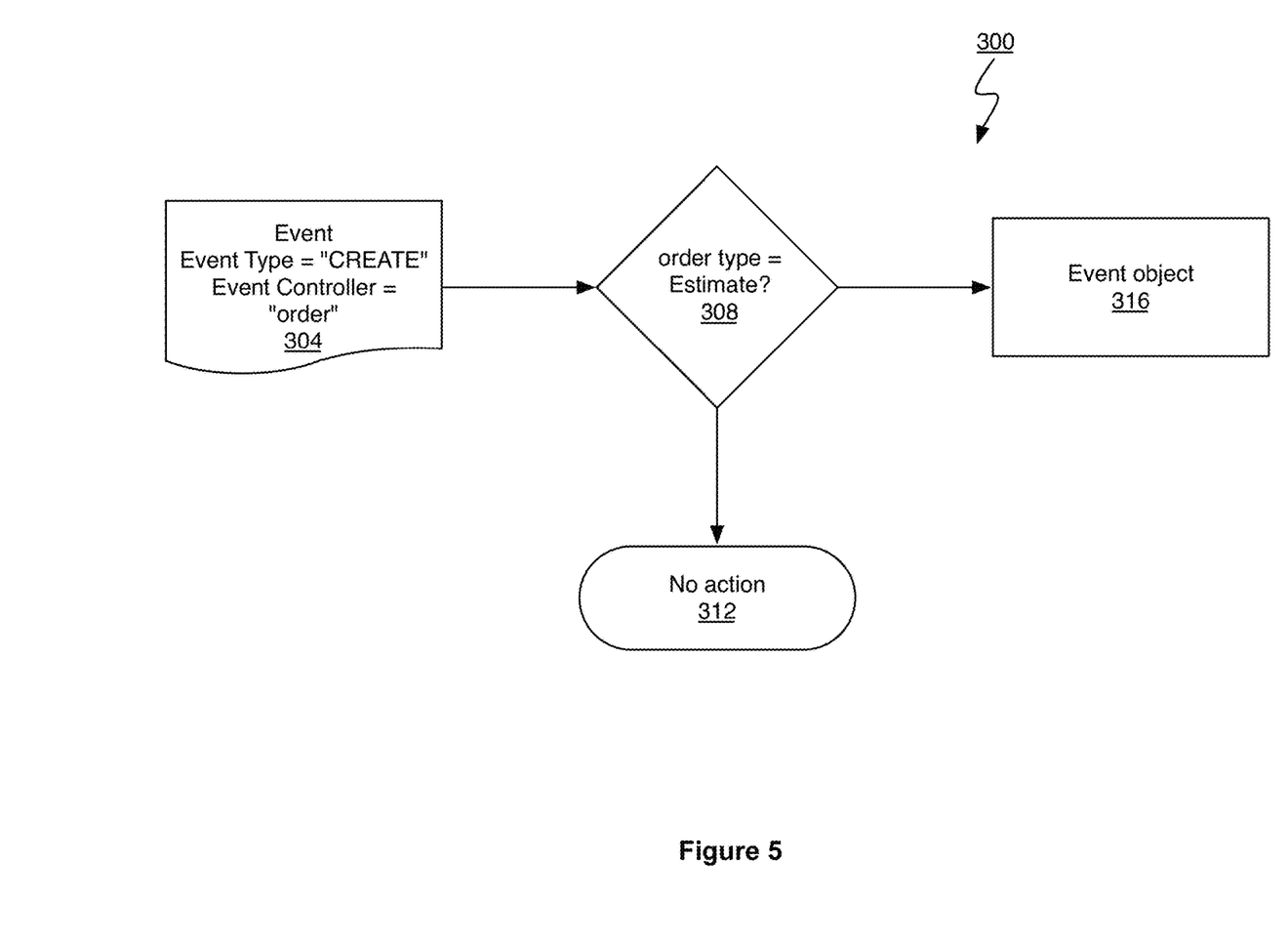
FIG. 5 shows the method of determining if an event object should be created for an event in a newsfeed during the method of FIG. 4.

FIG. 5 shows an example of the approach 300 of determining if an event of a particular event class and event action is useful information. In the particular illustrated example, the approach 300 is for the event class "order" and the event type "create". The newsfeed controller module 132 for the "order" event class receives an event of the event type "create" (304). The newsfeed controller module 132 then determines if the order type is "estimate" (308). If the order type is not "estimate", then it is determined that an event object does not need to be created for the event (312). If, instead, the order type is "estimate", then it is determined that an event object is to be created for the event (316). Event objects are created for order events only if they pertain to the creation of an estimate. As an aside, users can also create other types of orders that are not as important in the newsfeed.

Returning again to FIG. 4, if an event object need not be created for the selected event, the method 200 returns to 220, at which it is determined if there are remaining events in the list. If, instead, an event object is to be created for the selected event, a newsfeed event object is created (232).

After it is determined that a newsfeed event is useful and should be displayed to the end-user, a newsfeed object is created. These newsfeed objects are all similar and contain the following information:
  actor: the user that initiated the newsfeed action
  date: the timestamp of the action
  text: the item's text to be displayed to the user
  visibility: who the item is visible to
  reply visibility: who the replies to the item are visible to
  reply list: list of replies on the item The most interesting part of this creation is the text of the item. In the case of the distributor feed, there exists the freedom to display most of the applicable information about the event to the user. In most cases, the following information is fetched and displayed:
  order information: form number, totals
  client information: client name
  additional text: notes, approvals The newsfeed object text contains links to people, organizations and objects in the system based on the referenced objects from the log listener module. Object IDs are stored, and links are generated based on these IDs.

For suppliers, the text is made more generic. This can be achieved by obscuring part of the event data that is presented in the corresponding distributor newsfeed event object. In particular, a portion of the event data may be replaced with a more generic descriptor. For example, a customer for an order estimate may be "Acme Inc.". The distributor's newsfeed may indicate this name for the order estimate. In the supplier's newsfeed, the customer's name may be obscured, and even replaced with a generic descriptor of Acme Inc., such as "a client in the gadgets industry". Translation functionality within the newsfeed controller module 132 can determine how to translate event data for the event to make it more generic.

Order and client information are then linked to the same records in the CRM to make the newsfeed useful to the user so one click can cause additional information about the item to be displayed.

After the creation of an event object in the newsfeed, the method 200 returns to 220, at which it is determined if there are events remaining to be examined in the list.

Once all of the events in the list have been processed, organization-specific messages are retrieved for the user (236). The messages corresponding to the event keys of the events for which event objects were created and to the organization ID of the user are retrieved from the messages table 124. Next, user-specific messages are retrieved for the user (240). The messages that correspond to the event keys of the events for which event objects were created and that are from the user, to the user, or posted to an associated user-created group are retrieved.

The newsfeed controller module 132 then creates a newsfeed from the events and messages selected at 236 and 240 respectively (244). The newsfeed is sorted by date (248).

Upon completion of the newsfeed, it is sent to the user (252). In particular, the newsfeed is returned to the web interface executed on the distributor computer 24, the supplier computer 32 or the consumer computer 36.

The distributor is the hub of activity, interacting with both the suppliers to obtain products and quotes, and with the customers to provide quotes on products and orders. Accordingly, the distributor newsfeed generally presents a high level of detail for updates.

Figure 6:
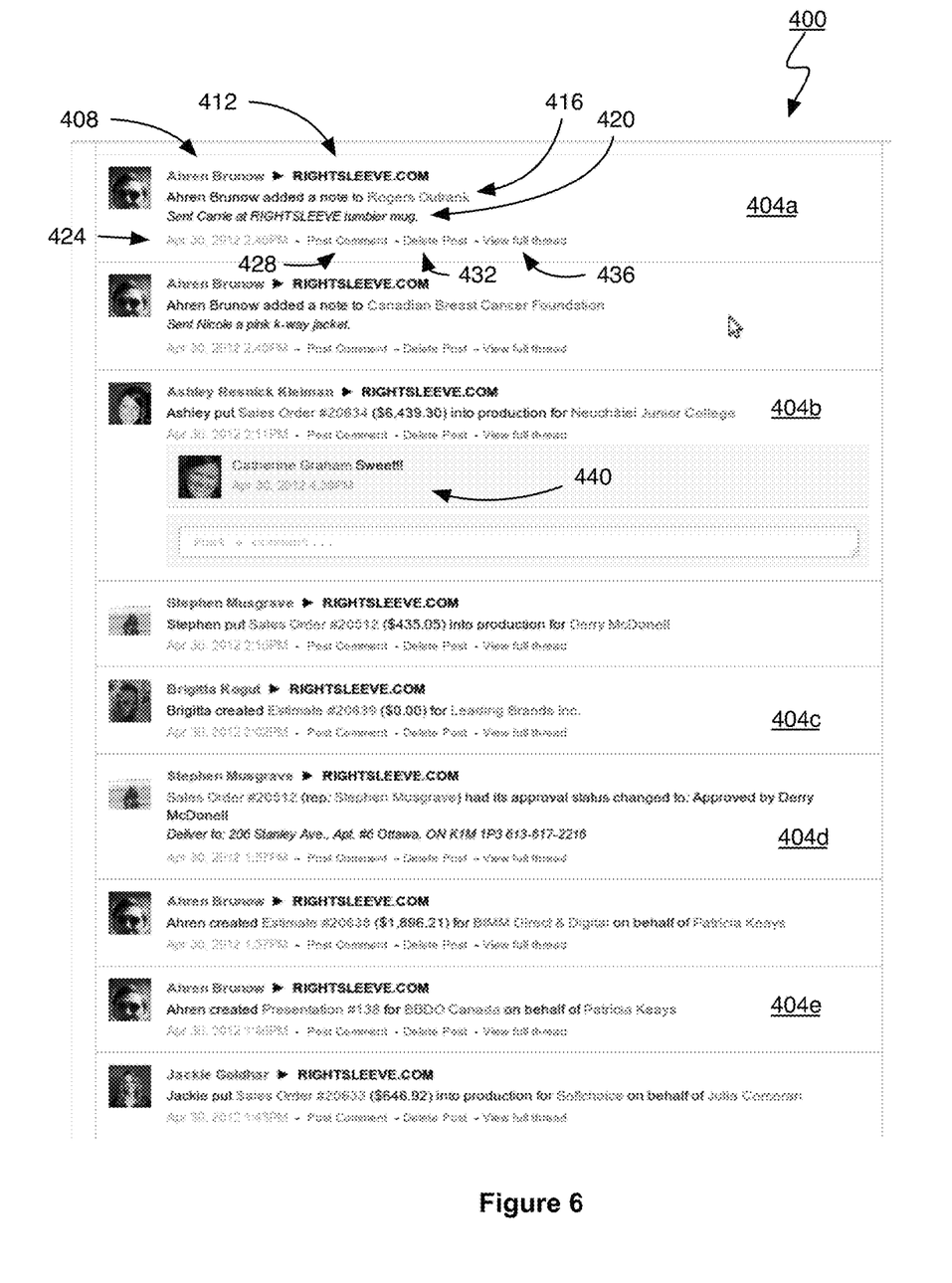
FIG. 6 shows a portion of an exemplary newsfeed generated for a distributor using the computer system of FIG. 1.

FIG. 6 shows an exemplary distributor newsfeed 400. The newsfeed shown presents both messages and events. The distributor newsfeed 400 contains a set of events that are presented as newsfeed objects, such as event object 404a. The event objects are all distinct and come from different sources. Event object 404a corresponds to a note. A user 408 that created the note is indicated, as well as the target 412 of the note. A corresponding description 416 is provided for the event object 404a. A text string 420 provides the actual text of the note. A date string 424 indicates when the note was created. A post comment link 428 allows users to post a comment in response to the note. A delete post link 432 allows users to delete a posted comment. A view full thread link 436 enables a user to expand and collapse the posts portion of the event object 404a. Currently, the event object 404a is collapsed, hiding any posts made on the note.

Another event object 404b corresponds to the placement of a sales order. As shown, event object 404b is expanded, showing a posted comment 440 made by a user on the order. Still another event objects 404c, 404d, and 404e correspond to the creation of an estimate for an order, the approval of an order, and the creation of a presentation respectively.

The supplier newsfeed follows the same basic flow as the distributor one. When the supplier newsfeed objects are created, however, they are given different information as there is some information that they do not have need to know of. For example, the suppliers need not know what order or estimate their products are being included in. Accordingly, the supplier newsfeeds are sanitized.

Figure 7:
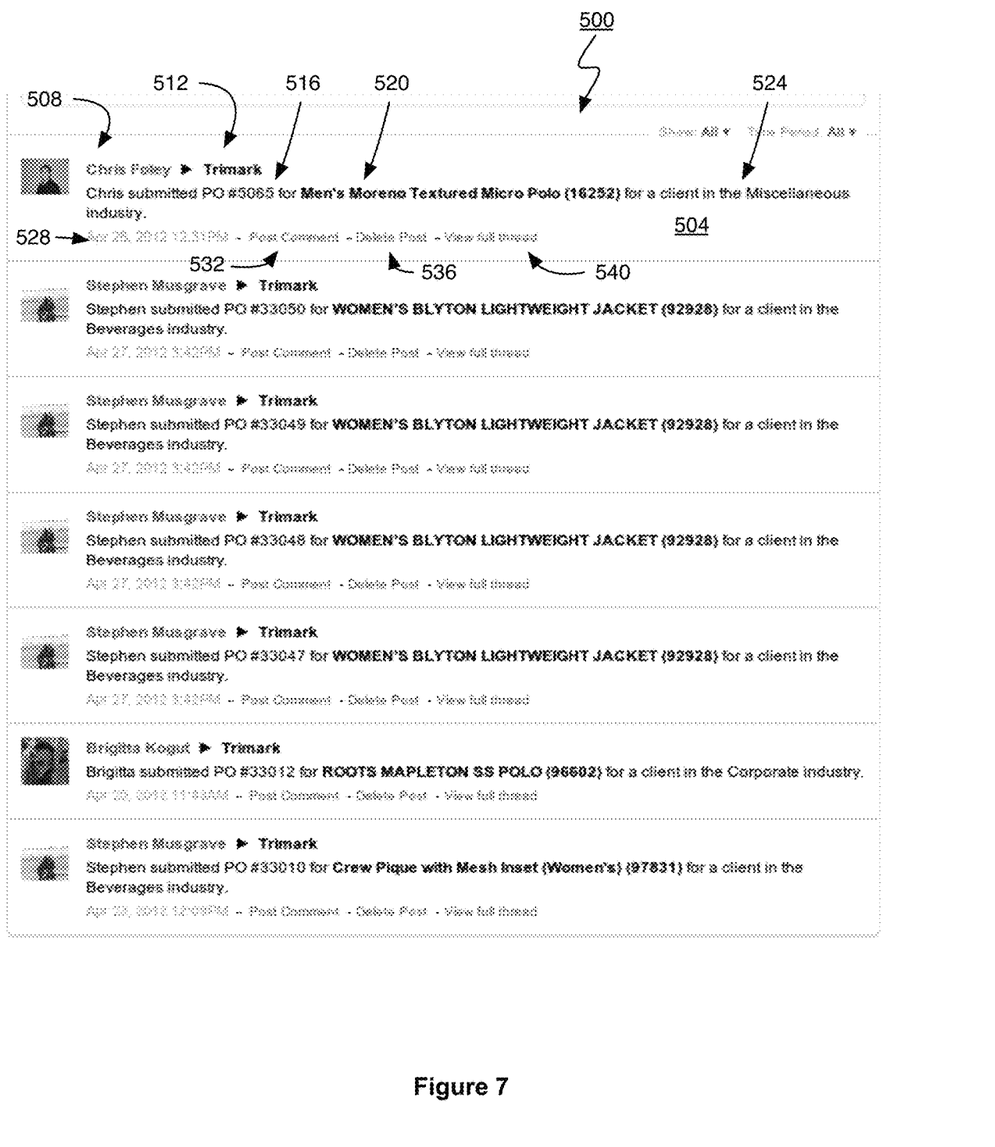
FIG. 7 shows a portion of an exemplary newsfeed generated for a supplier using the computer system of FIG. 1.

FIG. 7 shows an exemplary supplier newsfeed 500. The supplier newsfeed 500 contains a set of events that are presented as newsfeed objects, such as event object 504. Event object 504 corresponds to the placement of a purchase order. A user 508 that placed the purchase order is indicated, as well as the supplier 512 providing the product for the purchase order. The purchase order number 516 is shown in a description of the event, together with the product being ordered 520. The customer 524 for which the purchase order is being placed is generically identified by their industry type. The name of the customer is not revealed, as it is assumed that the supplier has no need to know this information. A date string 528 indicates when the purchase order was created. A post comment link 532 allows users to post a comment in response to the purchase order. A delete post link 536 allows users to delete a posted comment. A view full thread link 540 enables a user to expand and collapse the posts portion of the event object 504. Currently, the event object 504 is collapsed, hiding any posts made on the purchase order.

As will be noticed, the supplier newsfeed 500 does not present any pricing information for the purchase orders.

Computer-executable instructions for implementing the newsfeed application on a computer system could be provided separately from the computer system, for example, on a computer-readable medium (such as, for example, an optical disk, a hard disk, a USB drive or a media card) or by making them available for downloading over a communications network, such as the Internet.

While the computer system is shown as a single physical computer, it will be appreciated that the computer system can include two or more physical computers in communication with each other. Accordingly, while the embodiment shows the various components of the newsfeed application residing on the same physical computer, those skilled in the art will appreciate that the components can reside on separate physical computers.

One or more of the ERP applications may be operated on separate physical computer systems. Further, the data for the ERP applications may be pushed to the newsfeed application.

Multiple newsfeeds may be generated for events, each of the newsfeeds presenting different levels of details for the events and messages.

One or more portions of the method may be executed by third parties. For example, third parties may operate a web site for the newsfeeds, with the data for generating the newsfeeds being provided by the computer system.

The above-described embodiments are intended to be examples of the present invention and alterations and modifications may be effected thereto, by those of skill in the art, without departing from the scope of the invention that is defined solely by the claims appended hereto.

What is claimed is:

1. A method for providing newsfeed updates using a computer system, the method comprising:
    receiving login data from a current user;
    determining a current universal user identifier and a current organization identifier using the login data;
    retrieving a set of event data entries generated from an event in at least one enterprise resource planning (ERP) application executing on the computer system, each event data entry containing a universal user identifier entry and an organization identifier entry;
    selecting an event data entry from the set of event data entries matching the current universal user identifier and the current organization identifier;
    generating a newsfeed object comprising a text containing information obtained from the selected event data entry;
    determining that the current organization identifier matches a predetermined organization identifier and obscuring at least a portion of the text by replacing the at least the portion of the text with a descriptor of the at least the portion of the text, wherein the descriptor is different than the at least the portion of the text and wherein the predetermined organization identifier is selected from the group consisting of: a first organization identifier that denotes a distributor and a second organization identifier that denotes a supplier; and
    displaying the newsfeed object in a user interface, the displayed newsfeed object comprising a link to a record in the ERP application corresponding to the event.

2. The method of claim 1, wherein the first organization identifier is different from the second organization identifier.

3. The method of claim 2, wherein the event in the ERP application comprises one of: creation of a quote and placement of a purchase order.

4. The method of claim 2, determining that the current organization identifier is the second organization identifier, wherein the link presented in the newsfeed object when the organization identifier is the first organization identifier is absent when the current organization identifier is the second organization identifier.

5. The method of claim 1, further comprising forming the set of event data entries prior to the retrieving by reading log entries for the at least one enterprise resource planning application.

6. The method of claim 5, further comprising: assigning an event key to each of the event data entries and storing the set of event data entries along with their assigned event key in the database.

7. The method of claim 6, further comprising: retrieving message data having an event key corresponding to the selected event data entry and displaying the message data as part of the newsfeed object.

8. A computer system for providing newsfeed updates, comprising:
   processor readable storage storing a database;
   a processor executing a newsfeed application, the newsfeed application configured to:
      receive login data from a current user;
      retrieve a set of event data entries generated from an event in at least one enterprise resource planning (ERP) application, each event data entry containing a universal user identifier entry and an organization identifier entry;
      determine a current universal identifier and a current organization identifier based on the login data;
      select an event data entry from the set of event data entries matching the current universal user identifier and the current organization identifier;
      generate a first newsfeed object comprising a text containing information obtained from the selected event data entry;
      determine that the current organization identifier matches a predetermined organization identifier and obscure at least a portion of the text by replacing the at least the portion of the text with a descriptor of the at least the portion of the text, wherein the descriptor is different than the at least the portion of the text and wherein the predetermined organization identifier is selected from the group consisting of: a first organization identifier that denotes a distributor and a second organization identifier that denotes a supplier; and
      display the newsfeed object in a user interface, the displayed newsfeed object comprising a link to a record in the ERP application corresponding to the event.

9. The computer system of claim 8, wherein the first organization identifier is different from the second organization identifier.

10. The computer system of claim 9, wherein the event comprises one of: creation of a quote and placement of a purchase order.

11. The computer of claim 8, wherein the newsfeed application comprises a log listener module and an event logger module, and wherein the log listener reads log entries for the at least one enterprise resource planning application, the event logger obtains universal user identifiers corresponding to application user identifiers in the log and stores the set of event data entries together with corresponding ones of the obtained universal user identifiers.

12. The computer system of claim 11, wherein the newsfeed application stores the event data entries in the database.

13. The computer system of claim 12, wherein the newsfeed application retrieves message data from the database, the message data having an event key corresponding to the selected event data entry, and displays the message data as part of the newsfeed object.

14. The computer system of claim 13, determine that the current organization identifier is the second organization identifier, wherein the link presented in the newsfeed object is present when the organization identifier is the first organization identifier, is absent when the current organization identifier is the second organization identifier.

15. A non-transitory computer-readable medium having stored thereon, computer-executable instructions implementing a newsfeed application when executed on a computer system, the newsfeed application configured to:
   receive login data from a current user;
   retrieve a set of event data entries generated from an event in at least one enterprise resource planning (ERP) application, each event data entry containing a universal user identifier entry and an organization identifier entry;
   determine a current universal identifier and a current organization identifier based on the login data;
   select an event data entry from the set of event data entries matching the current universal user identifier and the current organization identifier;
   generate a first newsfeed object comprising a text containing information obtained from the selected event data entry;
   determine that the current organization identifier matches a predetermined organization identifier and obscuring at least a portion of the text by replacing the at least the portion of the text with a descriptor of the at least the portion of the text, wherein the descriptor is different than the at least the portion of the text and wherein the predetermined organization identifier is selected from the group consisting of: a first organization identifier that denotes a distributor and a second organization identifier that denotes a supplier; and
   display the newsfeed object in a user interface, the displayed newsfeed object comprising a link to a record in the ERP application corresponding to the event.

* * * * *